United States Patent
Ichikawa (10) Patent No.: US 8,734,971 B2
(45) Date of Patent: May 27, 2014

(54) FLUID PASSAGE STRUCTURE FOR FUEL CELL STACK

(75) Inventor: Yasushi Ichikawa, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1849 days.

(21) Appl. No.: 12/090,151

(22) PCT Filed: Oct. 25, 2006

(86) PCT No.: PCT/JP2006/321802
§ 371 (c)(1),
(2), (4) Date: Apr. 14, 2008

(87) PCT Pub. No.: WO2007/049790
PCT Pub. Date: May 3, 2007

(65) Prior Publication Data
US 2009/0176143 A1    Jul. 9, 2009

(30) Foreign Application Priority Data

Oct. 27, 2005    (JP) .................................. 2005-312999

(51) Int. Cl.
*H01M 2/14*    (2006.01)
(52) U.S. Cl.
USPC ........................................................... 429/34
(58) Field of Classification Search
USPC .......................................................... 429/39
See application file for complete search history.

(56) References Cited

U.S. PATENT DOCUMENTS

| | | | |
|---|---|---|---|
| 6,159,629 A * | 12/2000 | Gibb et al. .................... | 429/434 |
| 6,248,466 B1 | 6/2001 | Takahashi et al. | |
| 7,094,491 B2 | 8/2006 | Yoshimoto et al. | |
| 2003/0180603 A1 | 9/2003 | Richards | |
| 2005/0221159 A1 * | 10/2005 | Harada et al. .................. | 429/38 |

FOREIGN PATENT DOCUMENTS

| | | |
|---|---|---|
| JP | 63-181271 A | 7/1988 |
| JP | 6-314570 A | 11/1994 |
| JP | 8-171925 A | 7/1996 |
| JP | 2002-252021 A | 9/2002 |
| JP | 2004-259637 A | 9/2004 |
| JP | 2004259637 A * | 9/2004 |
| JP | 2006-172849 A | 6/2006 |
| WO | WO 2006/064922 A1 | 6/2006 |

* cited by examiner

*Primary Examiner* — Ula C Ruddock
*Assistant Examiner* — Daniel Gatewood
(74) *Attorney, Agent, or Firm* — Foley & Lardner LLP (57) ABSTRACT

A fluid passage structure for a fuel cell stack according to this invention comprises an internal manifold (16) formed on an inner side of a laminated body (1) of a plurality of fuel cells in a lamination direction, an external fluid passage (22) that supplies a fluid to the internal manifold (16), and a connection portion (16a) that connects the fluid passage to the internal manifold. Each fuel cell comprises an in-cell fluid passage (15) that is connected to the internal manifold (16) from an orthogonal direction. By forming the connection portion (16a) such that a swirl is generated in the internal manifold (16) using the energy of the fluid that flows into the internal manifold (16) from the fluid passage (22), a pressure deviation in a transverse section of the internal manifold (16) is reduced, and the fluid supply rate to each in-cell fluid passage (15) is made even.

8 Claims, 15 Drawing Sheets

FLUID PASSAGE STRUCTURE FOR FUEL CELL STACK

TECHNICAL FIELD

This invention relates to a structure of a fluid passage for distributing a fluid such as a fuel gas, an oxidant gas, or cooling water to each fuel cell in a fuel cell stack.

BACKGROUND ART

In a fuel cell stack having a large number of laminated fuel cells, it is important to distribute a fluid such as fuel gas evenly to each fuel cell in the stack and discharge the fluid evenly from each fuel cell. Each fuel cell is constituted by a cell main body and a separator laminated to either side of the cell main body. An in-cell fluid passage facing the cell main body is formed in the separator. Further, an internal manifold which distributes the fluid to the in-cell fluid passages and another internal manifold which collects the fluid that is discharged from the in-cell fluid passages penetrate in the fuel cell lamination direction, or in other words a direction that traverses the fuel cell stack longitudinally.

According to research conducted by the inventors, when fluid is supplied to an end portion of the internal manifold that opens to the outside of the fuel cell stack from an orthogonal direction, a large pressure deviation occurs in a transverse section of an upstream portion of the internal manifold. As a result of this pressure deviation, a bias occurs such that the fluid supply rate to the fluid passage of each fuel cell is low in the upstream portion of the internal manifold and high in a comparatively downstream part of the internal manifold.

Various proposals, such as the following, have been made with a view to correcting fluid distribution bias in a fuel cell stack.

JP2002-252021A, published by the Japan Patent Office in 2002, proposes disposing a columnar penetrating body at an appropriate gap from the inner periphery of the manifold and using this columnar penetrating body to rectify the fluid that flows into the manifold before supplying the fluid to the stack. JP2004-259637A, published by the Japan Patent Office in 2004, proposes connecting an introduction passage comprising a rectifying plate to the manifold. JPH06-314570A proposes rectifying the fluid by disposing a porous material between the manifold and the fluid passage.

DISCLOSURE OF THE INVENTION

In the proposal of JP2002-252021A, the columnar penetrating body must be inserted into the manifold and a gap through which the fluid flows must be secured between the penetrating body and the inner periphery of the manifold. As a result, an increase in the size of the manifold is inevitable. The proposals of JP2004-259637A and JPH06-314570A are problematic in that by employing the rectifying plate and the porous material, the number of constitutional components of the manifold increases, and since the rectifying plate and porous material apply flow resistance to the fluid, pressure loss occurs.

It is therefore an object of this invention to realize a simple and compact structure for a manifold of a fuel cell stack, with which a bias does not occur during fluid distribution and fluid discharge.

To achieve this object, this invention is a fluid passage structure for a fuel cell stack comprising an internal manifold formed on an inner side of a laminated body of a plurality of fuel cells in a lamination direction, and an external fluid passage that supplies a fluid to the internal manifold, wherein each fuel cell comprises an in-cell fluid passage connected to the internal manifold from an orthogonal direction, and the external fluid passage is connected to one end of the internal manifold from an orthogonal direction. The fluid passage structure comprises a connection portion that connects the fluid passage to the internal manifold such that a swirl is generated in the internal manifold using the energy of the fluid that flows into the internal manifold from the fluid passage.

The details as well as other features and advantages of this invention are set forth in the remainder of the specification and are shown in the accompanying drawings.

BEST MODES FOR CARRYING OUT THE INVENTION

Figure 1:
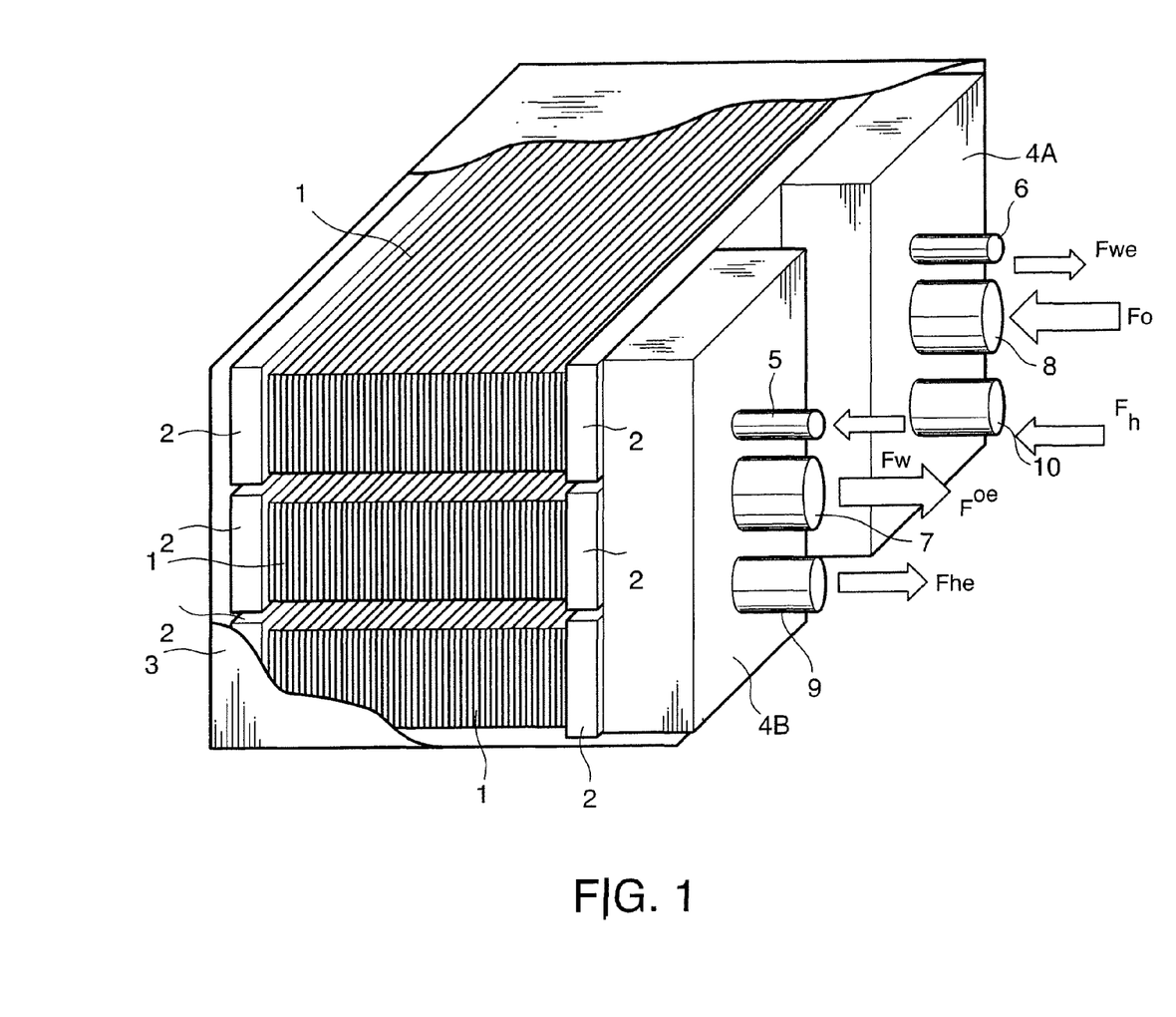
FIG. 1 is a partially cut-away perspective view of a fuel cell stack comprising a fluid passage structure according to this invention.

Referring to FIG. 1 of the drawings, a fuel cell stack comprises three stack main bodies 1 in which a large number of fuel cells constituted by a cell main body and a separator are stacked, a pair of external manifolds 4A, 4B provided adjacent to the three stack main bodies 1, and a case 3 housing the stack main bodies 1 and the external manifolds 4A, 4B. The fuel cells constituting each stack main body 1 are held in a laminated state by an endplate 2 disposed on either end of the stack main body 1. The pair of external manifolds 4A, 4B are provided to supply a fuel gas, an oxidant gas, and water to the three stack main bodies 1 and collect used fuel off-gas, oxidant off-gas and surplus water from the three stack main bodies 1.

A surplus moisture discharge pipe 6 that discharges surplus moisture Fwe, an oxidant gas supply pipe 8 that supplies oxidant gas Fo, and a fuel gas supply pipe 10 that supplies fuel gas Fh are connected to one of the external manifolds 4A. A water supply pipe 5 that supplies water Fw, an oxidant off-gas discharge pipe 7 that discharges oxidant off-gas Foe, and a fuel off-gas discharge pipe 9 that discharges fuel off-gas Fhe are connected to the other external manifold 4B.

Figure 2:
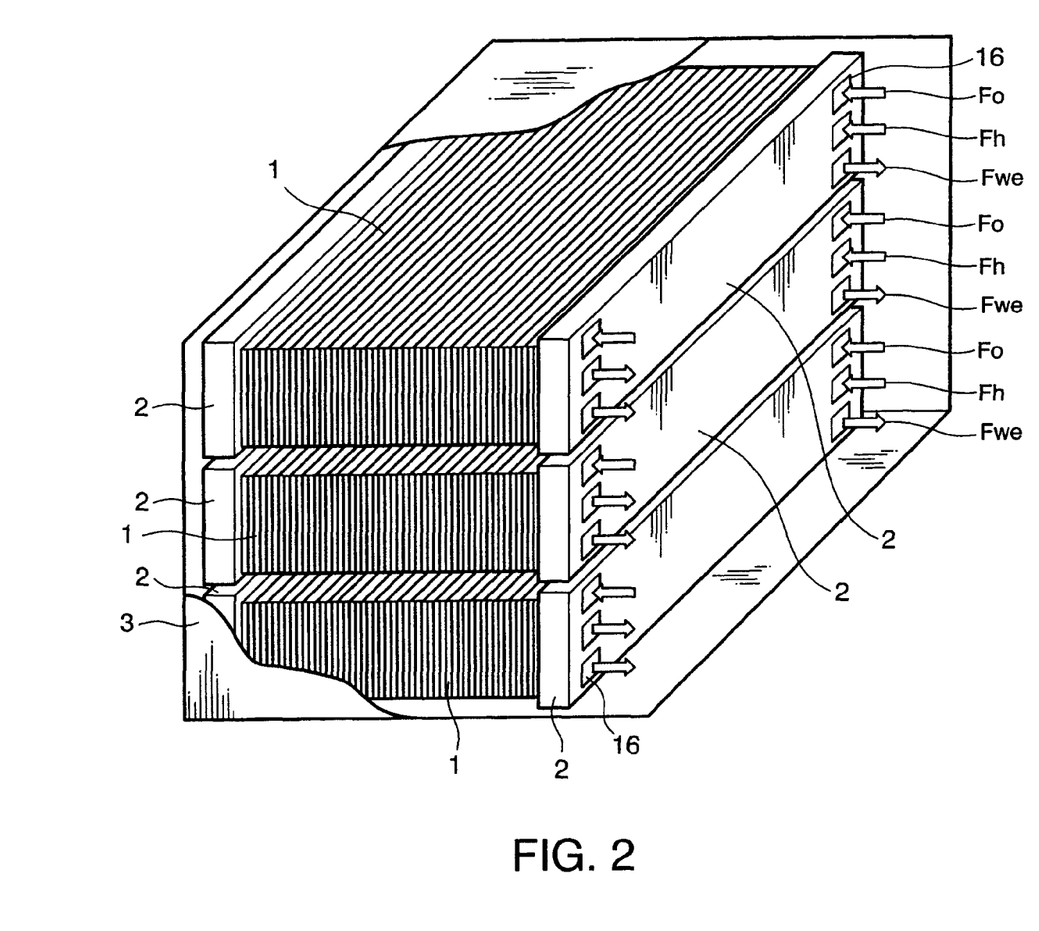
FIG. 2 is similar to FIG. 1, but shows a state in which an external manifold has been removed.

Referring to FIG. 2, three internal manifolds 16 communicating with the surplus moisture discharge pipe 6, the oxidant gas supply pipe 8 and the fuel gas supply pipe 10 of the external manifold 4A, respectively, open onto one end of one of the endplates 2 of each stack main body 1. Three internal manifolds 16 communicating with the water supply pipe 5, the oxidant off-gas discharge pipe 7 and the fuel off-gas discharge pipe 9 of the other external manifold 4B, respectively, open onto the other end of the endplate 2 of each stack main body 1. Thus, the opening portions of the respective internal manifolds 16 are formed at both ends of each endplate 2 in a row of three in a vertical direction.

The internal manifolds 16 are connected to the corresponding pipe via a space 20 formed for each fluid in the external manifolds 4A, 4B.

Figure 4:
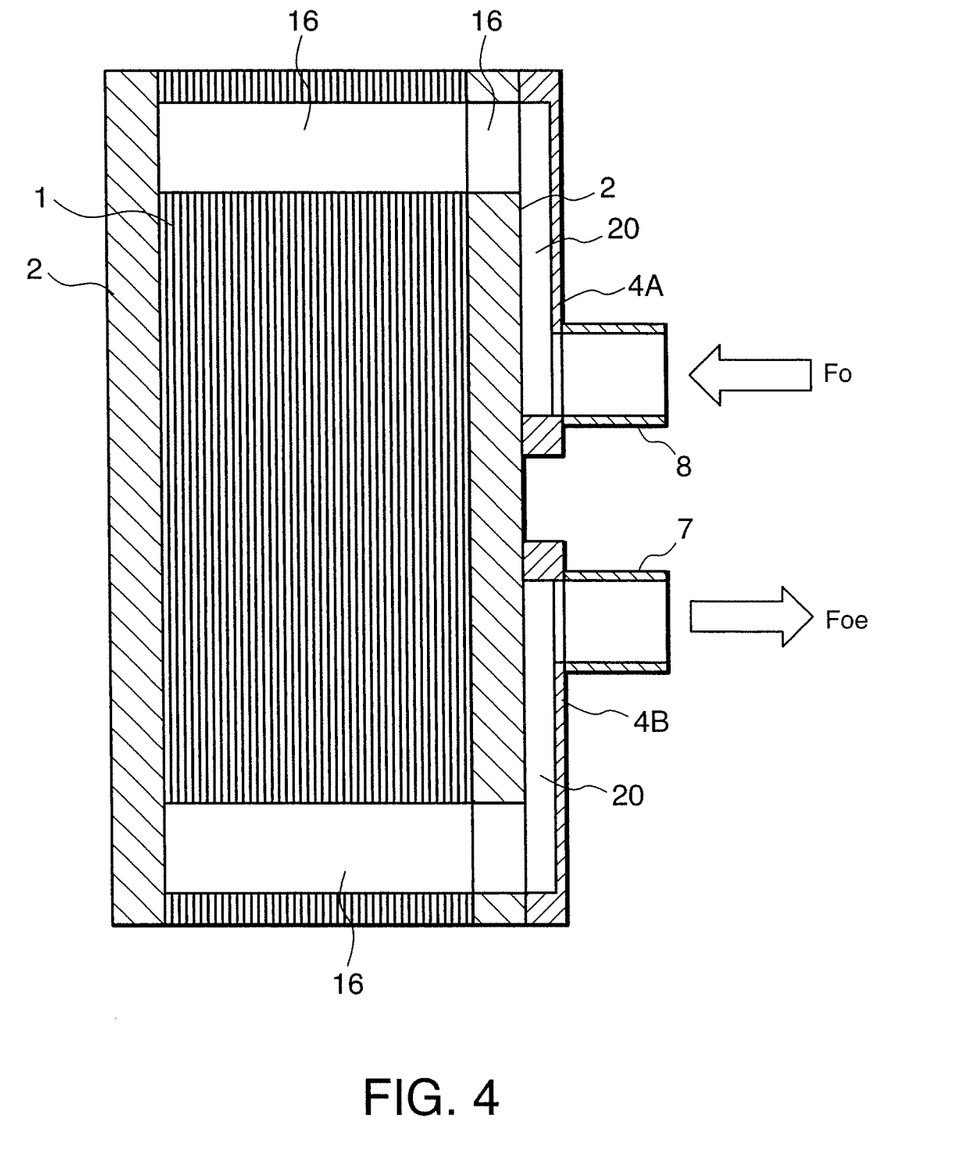
FIG. 4 is a schematic horizontal sectional view of the fuel cell stack.

Referring to FIG. 4, each internal manifold 16 is formed to penetrate the stack main body 1 such that a terminal end of each internal manifold 16 is closed by the endplate 2 positioned on the opposite side of the stack main body 1 to the external manifolds 4A, 4B. As regards supply of the oxidant gas Fo and discharge of the oxidant off-gas Foe, for example, the oxidant gas Fo is supplied to the oxidant gas space 20 in the external manifold 4A from the oxidant gas supply pipe 8. The oxidant gas Fo is distributed to the oxidant gas internal manifold 16, shown in the upper portion of the figure, of each stack main body 1 from the oxidant gas space 20.

Figure 3:
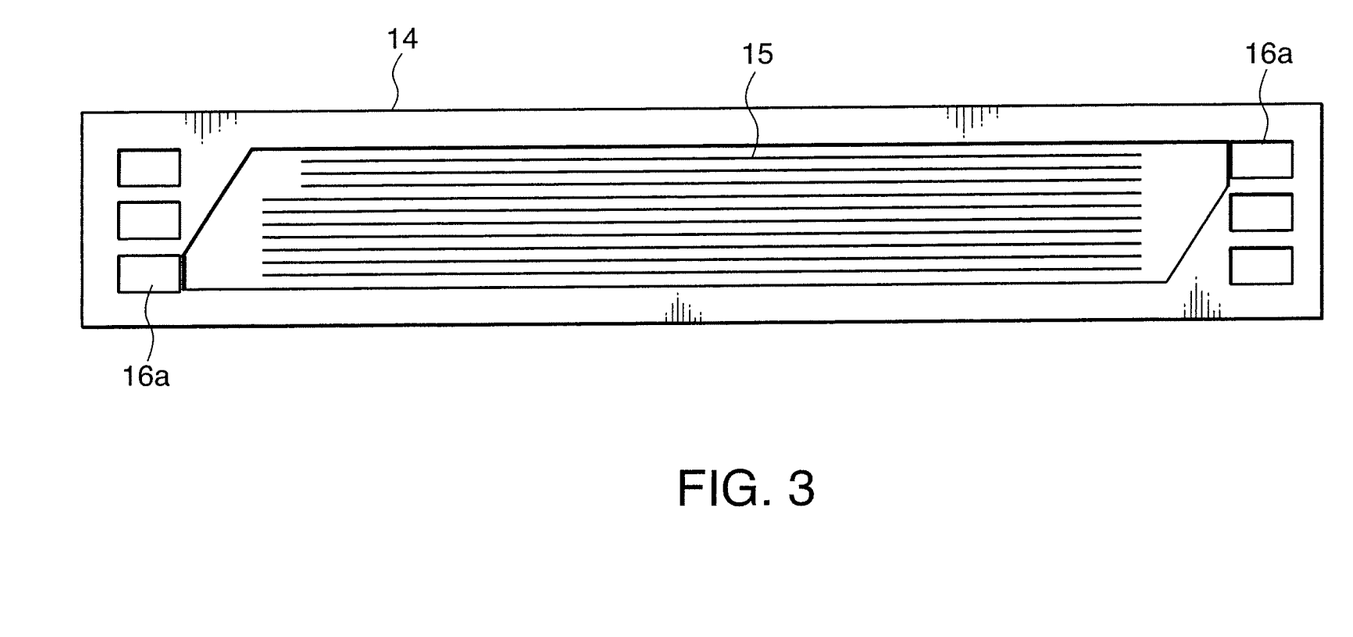
FIG. 3 is a front view of a separator according to this invention.

Referring to FIG. 3, the internal manifold 16 communicates with one end of an in-cell fluid passage 15 formed in the separator 14 of each fuel cell. The other end of the in-cell fluid passage 15 is connected to the internal manifold 16 penetrating an end portion on the opposite side of the separator 14 from an orthogonal direction.

In each separator 14, therefore, the oxidant gas Fo is distributed to the in-cell fluid passage 15 from the internal manifold 16 in the upper right of the figure, and consumed in the in-cell fluid passage 15. Oxidant gas remaining in the in-cell fluid passage 15 is discharged to the internal manifold 16 that opens onto the lower left of the figure as the oxidant off-gas Foe.

Referring back to FIG. 4, the oxidant off-gas Foe is collected in the oxidant off-gas space 20 of the external manifold 4B from the internal manifold 16 positioned in the lower portion of the figure, and discharged to the oxidant off-gas discharge pipe 7.

Supply of the water Fw, discharge of the surplus water Fwe, supply of the fuel gas Fh, and discharge of the fuel off-gas Fhe are performed similarly via dedicated internal manifolds 16 formed in the stack main body 1 and dedicated spaces 20 formed in the external manifolds 4A, 4B.

Figure 5:
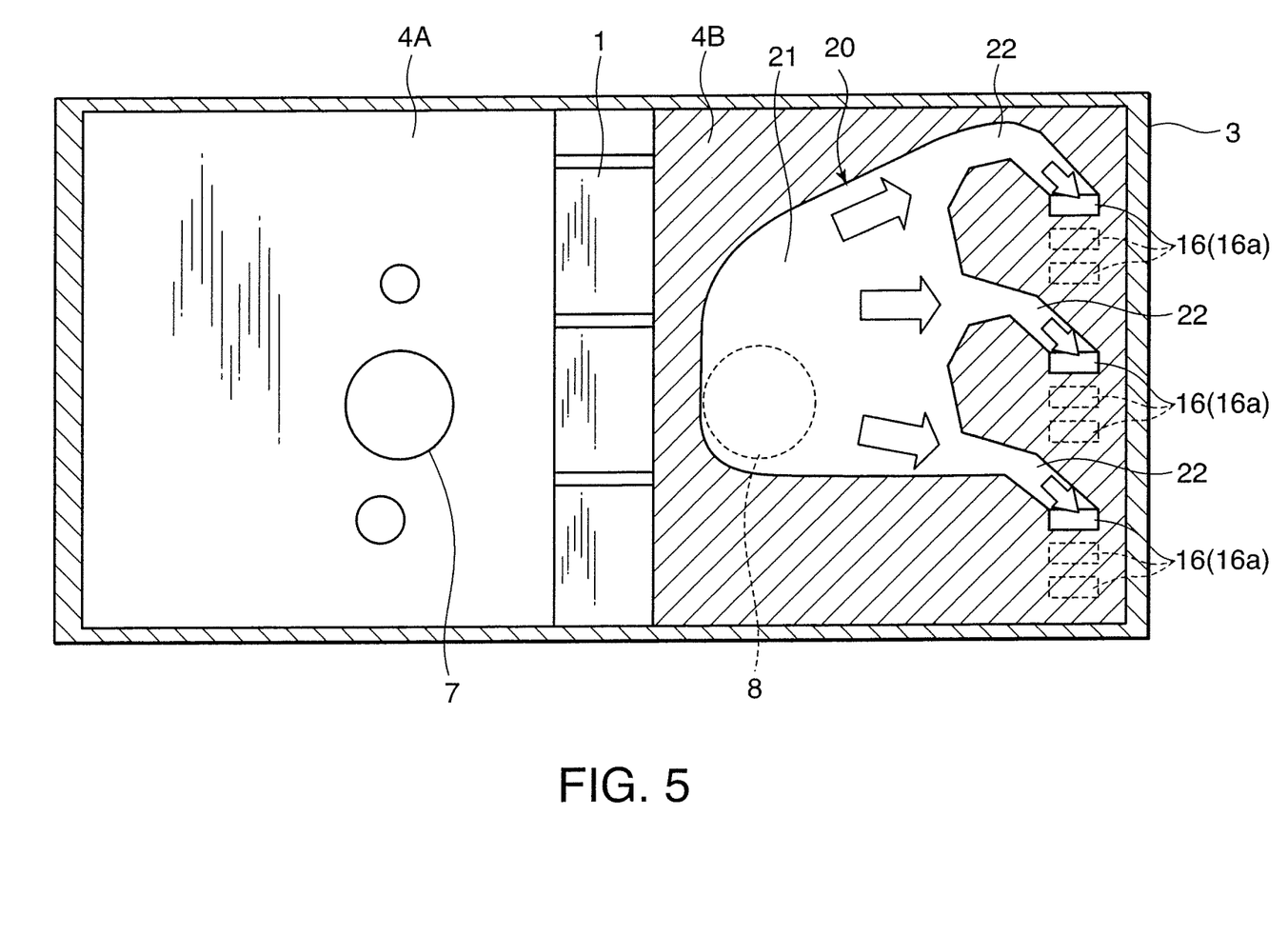
FIG. 5 is a compound diagram showing a front view and a vertical sectional view of the external manifold according to this invention.

Next, referring to FIG. 5, the shape of the space 20 will be described.

The space 20 formed in the external manifold 4B is constituted by a storage portion 21 in which oxidant gas flowing in from the oxidant gas supply pipe 8 is stored temporarily, and three external fluid passages 22 that distribute the oxidant gas in the storage portion 21 to the respective oxidant gas internal manifolds 16 of the stack main bodies 1.

The three external fluid passages 22 are connected respectively to connection portions 16a of the internal manifolds 16 in an orthogonal direction to the internal manifold 16. When forming this connection, a connection structure that enables the oxidant gas flowing into the internal manifold 16 from the external fluid passage 22 to form a swirl in the interior of the internal manifold 16 is applied.

Figure 6:
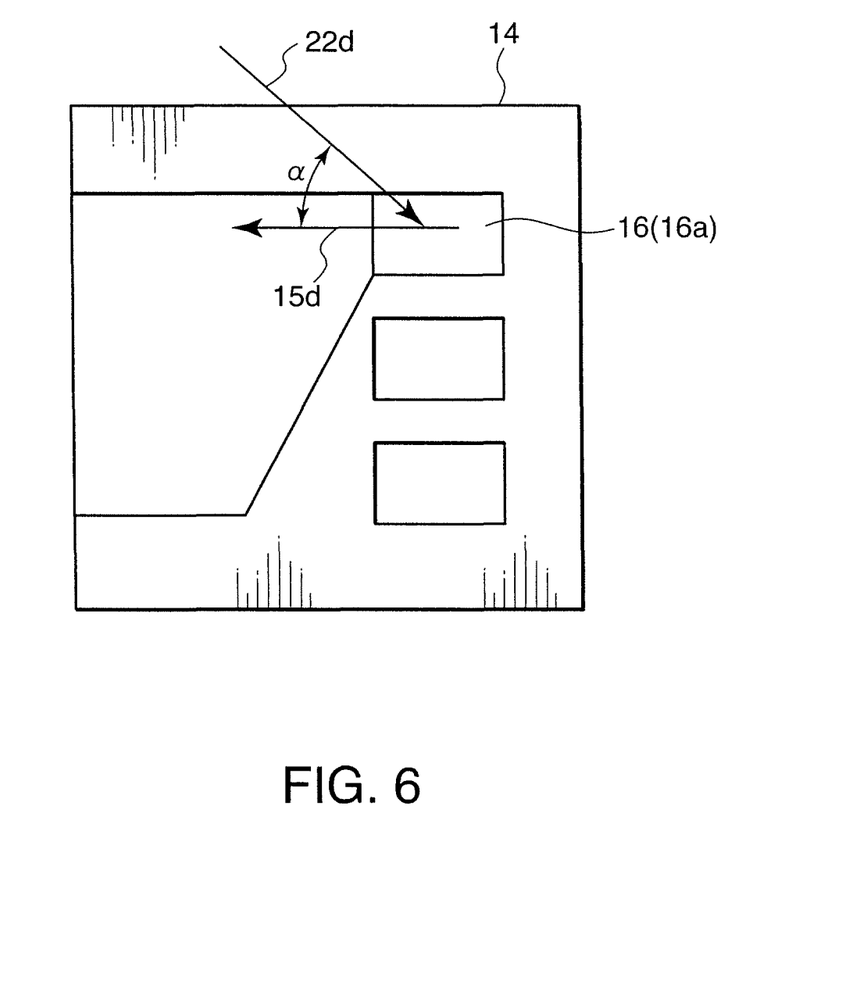
FIG. 6 is an enlarged front view of the main parts of the separator, illustrating an intersection angle α of a flow line.

In this embodiment, as shown in FIG. 6, this is realized by forming the internal manifold 16 with a flat rectangular cross-section and connecting the external fluid passage 22 to the internal manifold 16 from diagonally above such that a center line $22d$ of the external fluid passage 22 and a formation direction $15d$ of the in-cell fluid passage 15 form a predetermined intersection angle $\alpha$. Here, the intersection angle $\alpha$ takes a value larger than zero degrees and smaller than ninety degrees.

The reason for forming a swirl in the interior of the internal manifold 16 is as follows.

The oxidant gas supplied to the stack main body 1 flows into the internal manifold 16 at high speed. At a maximum, the inflow speed reaches between 50 and 100 meters per second.

Figure 16:
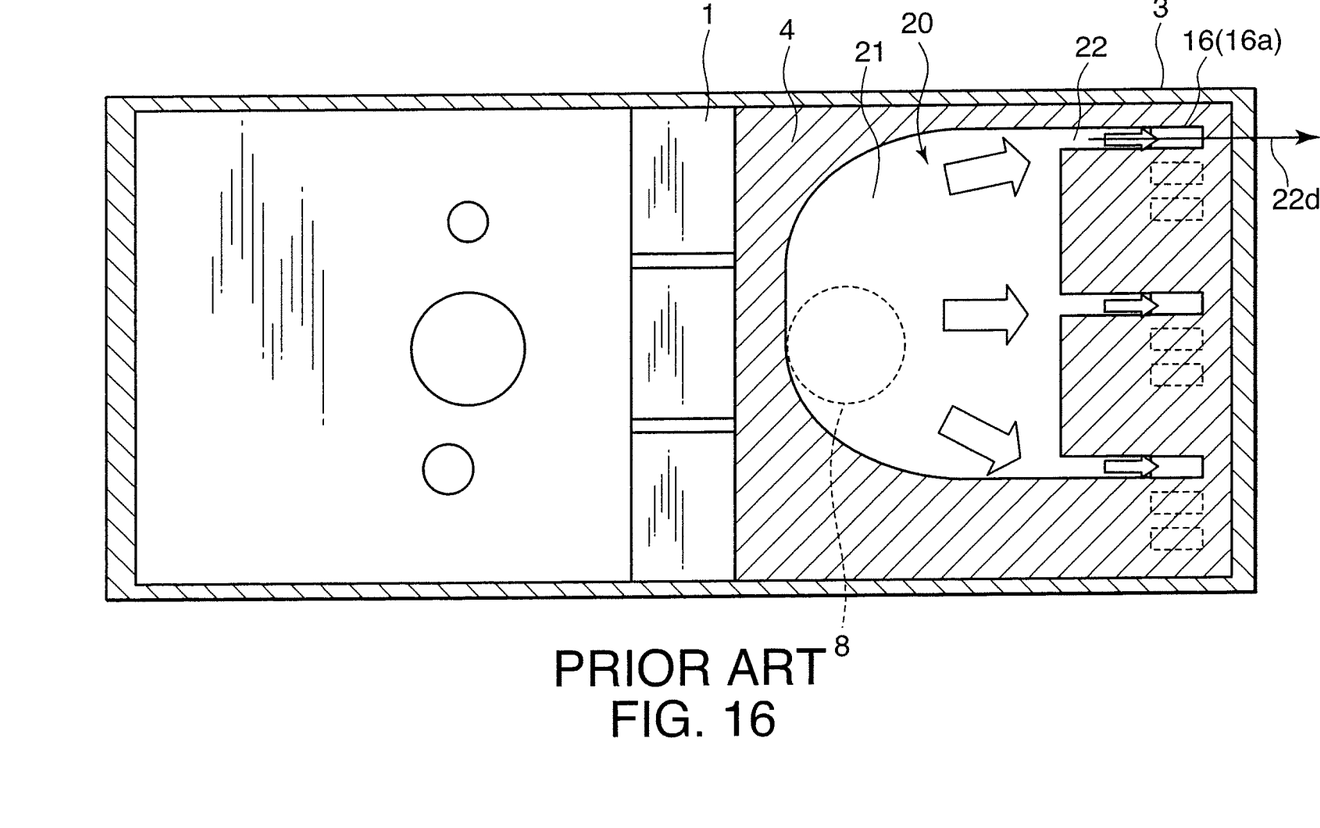
FIG. 16 is a compound diagram showing a front view and a vertical sectional view of an external manifold, illustrating a conventional fluid passage structure in which the intersection angle α of the flow line is set at zero.
Figures 17A, 17B:
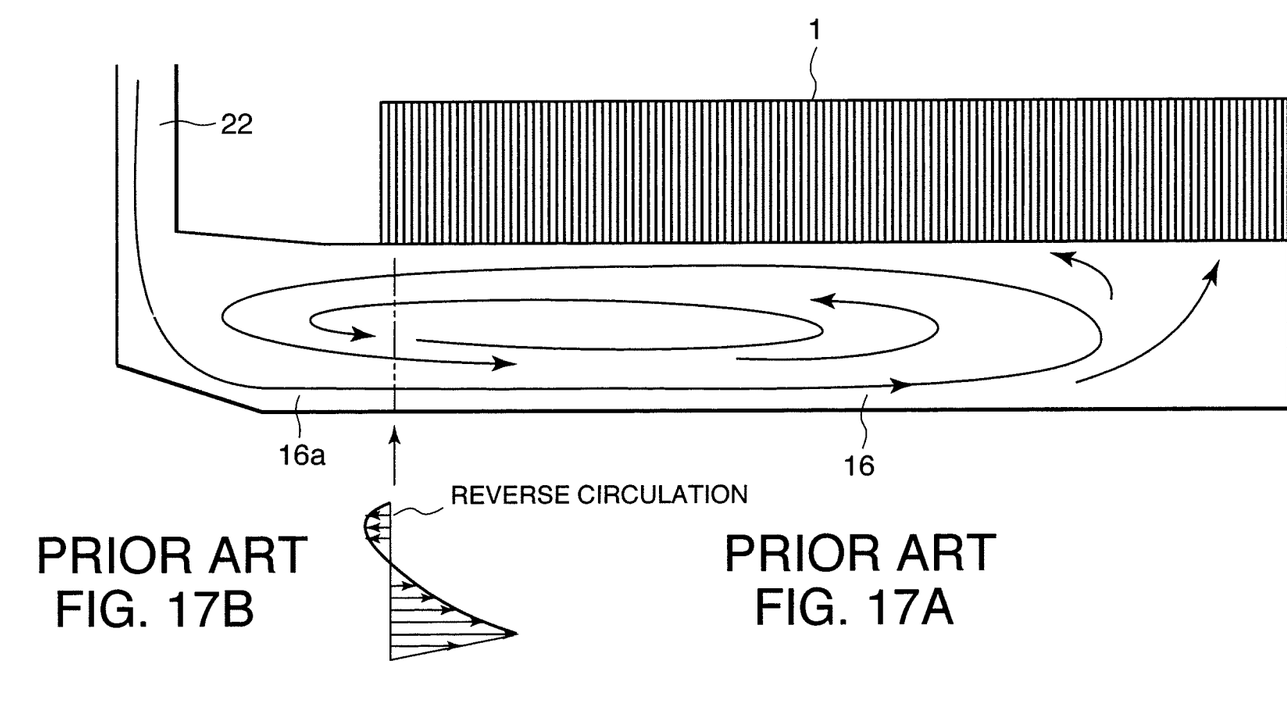
FIGS. 17A and 17B are a horizontal sectional view of a fuel cell stack and a diagram showing a flow rate distribution in a transverse section of an upstream portion of an internal manifold, illustrating an reverse circulation phenomenon occurring in a conventional fluid passage structure.

The external fluid passage 22 is connected to the connection portion 16a from an orthogonal direction to the internal manifold 16, and therefore, when the intersection angle $\alpha$ between the external fluid passage 22 and the formation direction $15d$ of the in-cell fluid passage 15 is set at zero degrees, as shown in FIG. 16, the flow direction of the oxidant gas flowing in at high speed shifts by ninety degrees at the connection portion 16a, leading to a large bias on the outside of the bend, as shown in FIGS. 17A and 17B, whereby the oxidant gas becomes separated from the stack main body 1 side wall surface on the upstream portion of the internal manifold 16. As a result, a large pressure deviation occurs in the transverse section of the upstream portion of the internal manifold 16, leading to the occurrence of a reverse circulation phenomenon, whereby the downstream oxidant gas flows back in the low-pressure part of the internal manifold 16 on the stack main body 1 side, as shown in the figure. FIG. 17B shows the speed distribution of the oxidant gas in the transverse section of the internal manifold 16, taken near an inlet to the in-cell fluid passage 15 of the fuel cell positioned on the furthest upstream side of the internal manifold 16.

Figure 14:
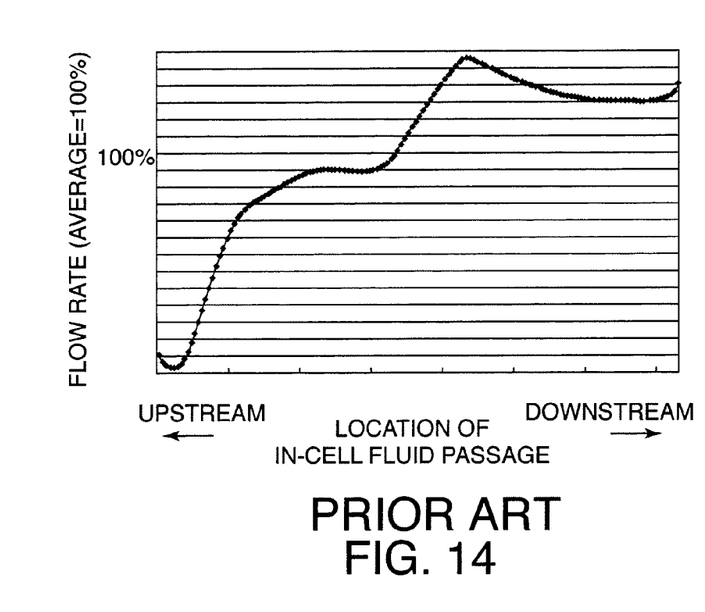
FIG. 14 is a diagram showing the result of a simulation conducted by the inventors in relation to the flow rate of an in-cell fluid passage according to a conventional fluid passage structure, in which the intersection angle α of the flow line is set at zero.

Under conditions in which the reverse circulation phenomenon occurs, the inlet portion of the in-cell fluid passage 15 that faces the upstream portion of the internal manifold 16 falls to a lower pressure than the inlet portion of the in-cell fluid passage 15 that faces the downstream portion of the internal manifold 16. As a result of this differential pressure, the oxidant gas supply rate to the in-cell fluid passage 15 facing the upstream portion of the internal manifold 16 falls below that of the other in-cell fluid passages 15. FIG. 14 shows the result of a simulation conducted by the inventors to compare the oxidant gas supply rate to each fuel cell under these conditions. As shown in the figure, a large bias occurs in the oxidant gas supply rate to the respective fuel cells constituting the stack main body 1.

The connection structure according to this invention is formed such that a swirl is generated in the interior of the internal manifold 16, thereby reducing the pressure deviation in the transverse section of the internal manifold 16 to ensure that the oxidant gas flow does not become separated and the reverse circulation phenomenon does not occur. To put it differently, generating swirl in the interior of the internal manifold 16 means providing the flow of oxidant gas through the internal manifold 16 with a transverse direction speed component.

Figures 18A, 18B:
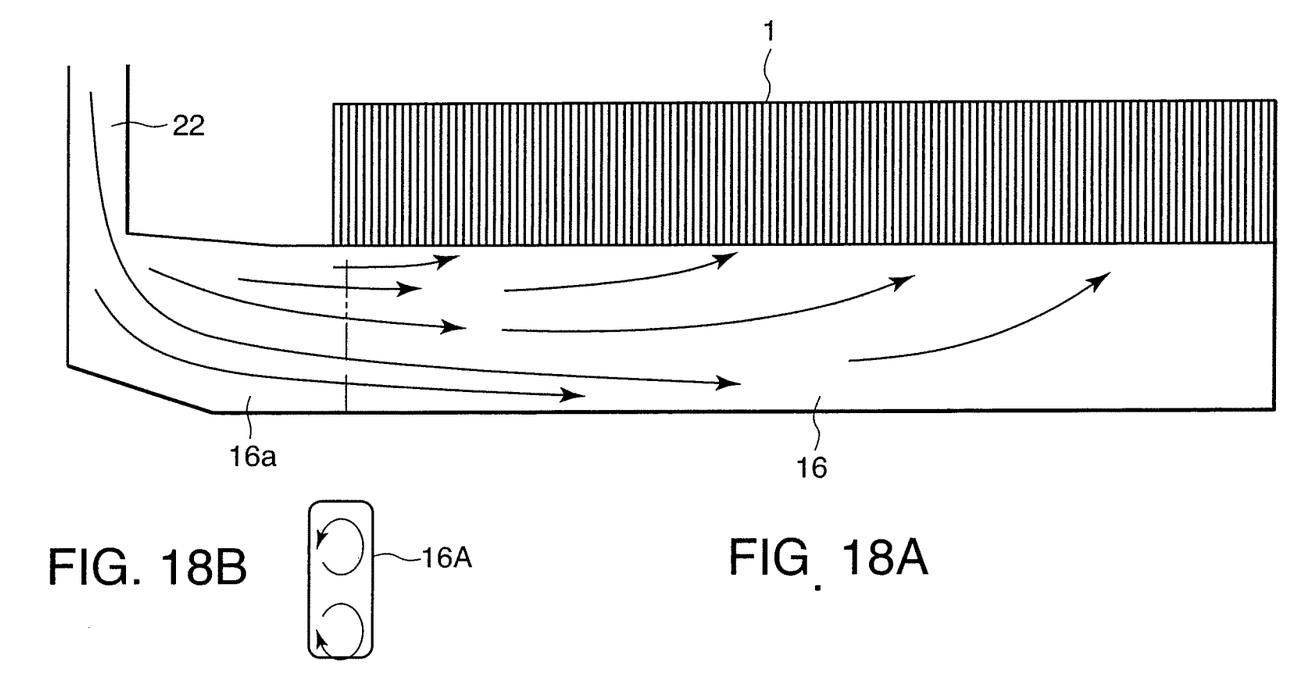
FIGS. 18A and 18B are a horizontal sectional view of a fuel cell stack and a transverse sectional view of the upstream portion of the internal manifold, illustrating a fluid flow condition according to the fluid passage structure of this invention.
Figure 19:
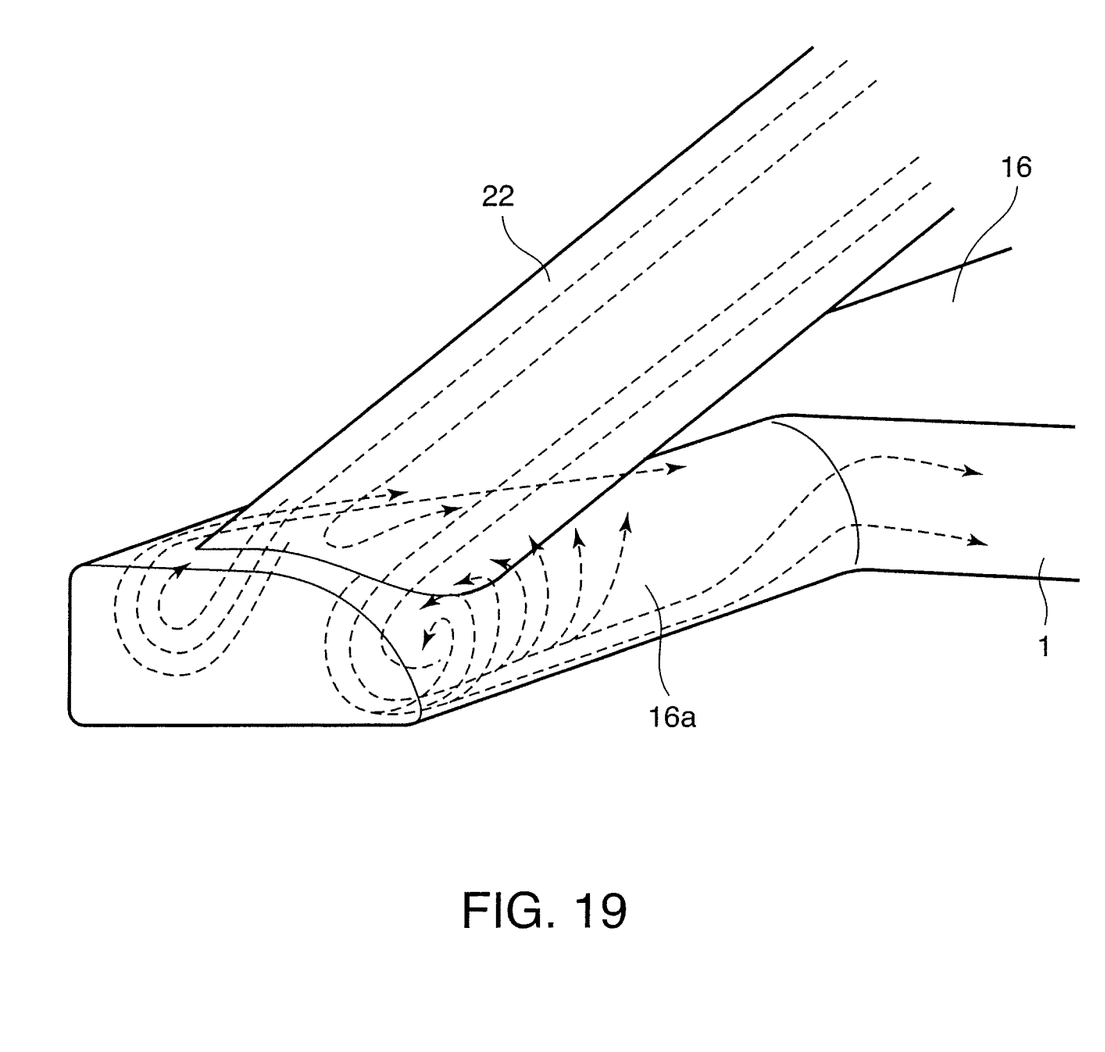
FIG. 19 is a transparent perspective view illustrating the fluid flow condition in the external fluid passage, a connection portion, and the internal manifold according to this invention.

FIGS. 18A, 18B and 19 show aspects of the flow of oxidant gas from the external fluid passage 22 to the internal manifold 16 via the connection portion 16a when the internal manifold 16 is formed with a flat rectangular cross-section and the external fluid passage 22 is connected to the internal manifold 16 at the predetermined intersection angle α. These figures were produced as a result of simulations conducted by the inventors.

As shown in FIG. 18B and FIG. 19, with this constitution, a bidirectional swirl is formed in the connection portion 16a and the transverse section of the upstream portion of the internal manifold 16. As a result, the pressure deviation in the transverse section is eliminated. It should be noted, however, that the wind direction of the swirl formed in the connection portion 16a may be unidirectional rather than bidirectional.

Figure 15:
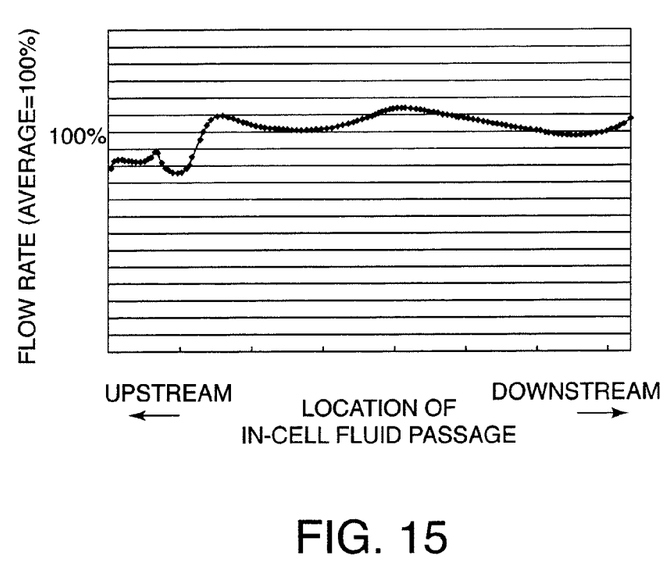
FIG. 15 is a diagram showing the result of a simulation conducted by the inventors in relation to the flow rate of the in-cell fluid passage according to the fluid passage structure of this invention.

With this connection structure, when the swirl is generated in the interior of the internal manifold 16, the pressure deviation in the transverse section of the internal manifold 16 decreases, leading to a reduction in the pressure at the inlet portion to each in-cell fluid passage 15. As a result, the oxidant gas supply rate to each of the fuel cells constituting the stack main body 1 is made even, as shown in FIG. 15, and therefore the power generation efficiency of the stack main body 1 can be improved.

The above description relates to the supply of oxidant gas, but by applying a similar connection structure, this invention also obtains favorable effects in relation to the supply of fuel gas and water. In this case, dedicated spaces 20 for each fluid are formed individually in the external manifolds 4A, 4B and disposed so as not to interfere with each other.

In the embodiment described above, the intersection angle α is set identically in all of the three connection portions 16a, but the intersection angles α do not necessarily have to be identical. Preferred values of the intersection angle α differ according to the type and speed of the fluid, the shape and dimensions of the external fluid passage 22 and internal manifold 16, and so on.

The connection structure for forming the swirl is not limited to the setting of the intersection angle α, and may employ various other constitutions.

Referring to FIGS. 7-13, variations of the connection structure will be described as different embodiments of this invention.

Figure 7:
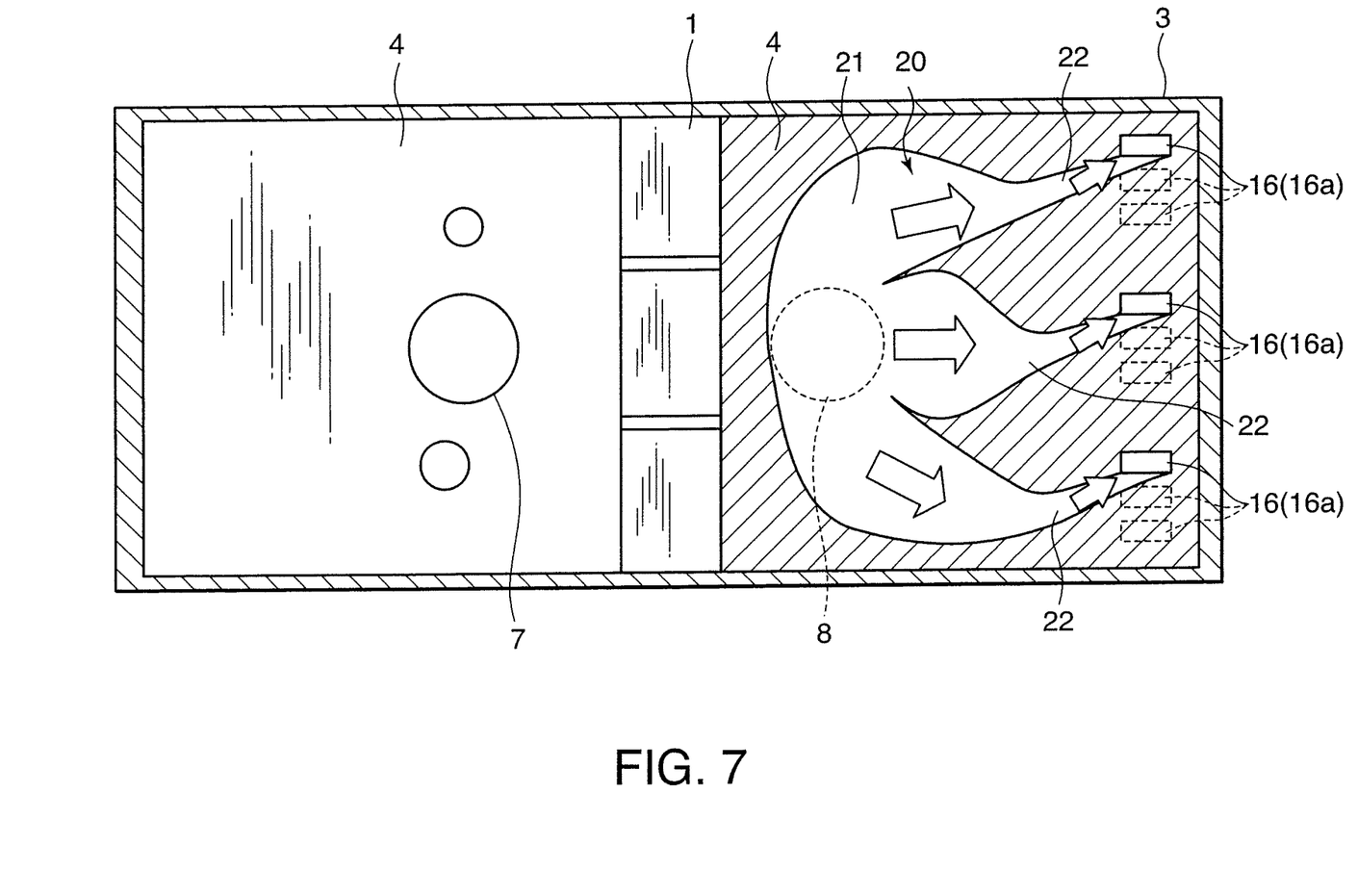
FIG. 7 is similar to FIG. 5, but shows a second embodiment of this invention.

Referring to FIG. 7, in a connection structure according to a second embodiment of this invention, the intersection angle α is secured by connecting the external fluid passage 22 to the connection portion 16a from diagonally below.

Figure 8:
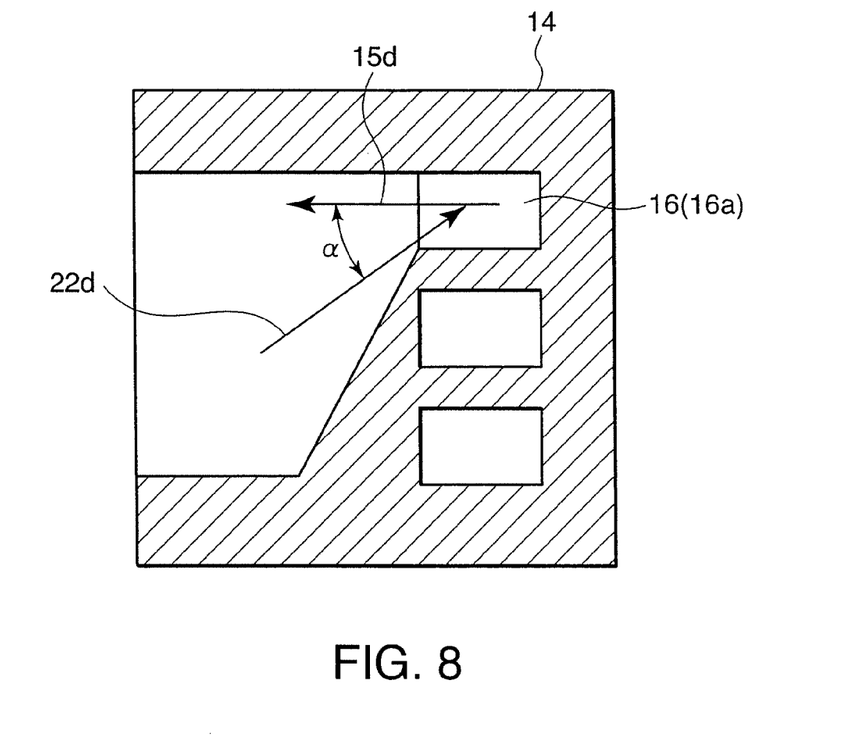
FIG. 8 is similar to FIG. 6, but shows a third embodiment of this invention.
Figure 9:
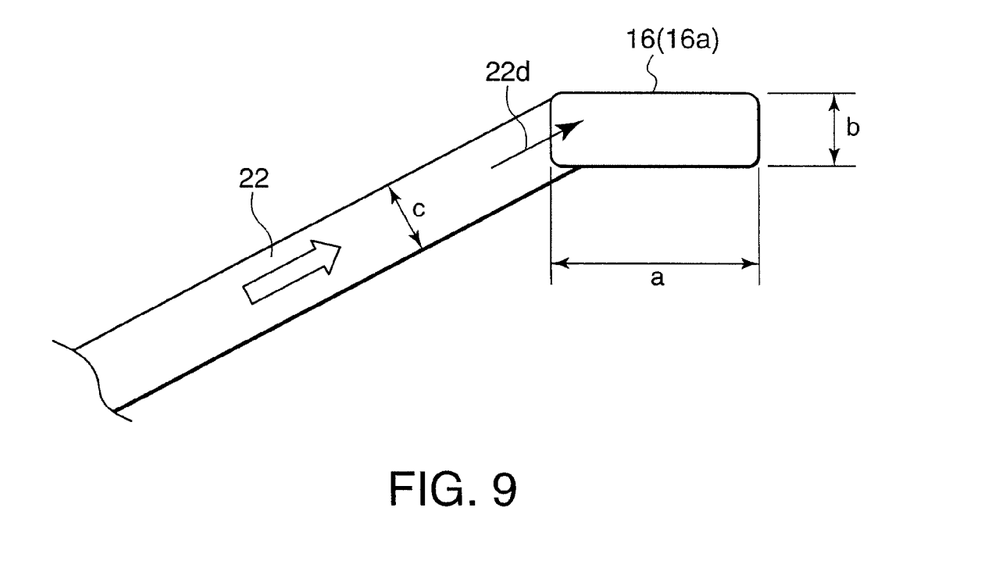
FIG. 9 is a schematic constitutional diagram of a connection portion between an external fluid passage and an internal manifold according to the third embodiment of this invention.

Referring to FIGS. 8 and 9, in a connection structure according to a third embodiment of this invention, the external fluid passage 22 is connected to the connection portion 16a from diagonally below in accordance with the intersection angle α, similarly to the second embodiment, but the connection position differs from the embodiment shown in FIG. 7. In the second embodiment, the external fluid passage 22 opens onto a bottom portion of the connection portion 16a having a flat rectangular cross-section, whereas in this embodiment, the external fluid passage 22 opens onto a side face of the similarly shaped connection portion 16a. When the horizontal dimension of the opening portion 16a is a, the vertical dimension is b, and the passage width of the external fluid passage 22 is c, the dimensions of the opening portion 16a and the external fluid passage 22 are set such that a>c and a>b.

Figure 10:
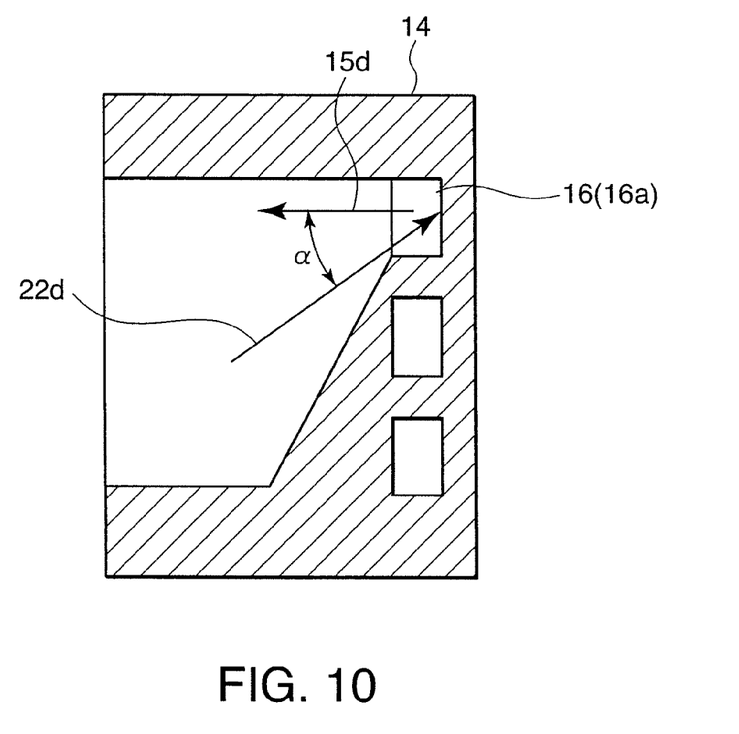
FIG. 10 is similar to FIG. 6, but shows a fourth embodiment of this invention.
Figure 11:
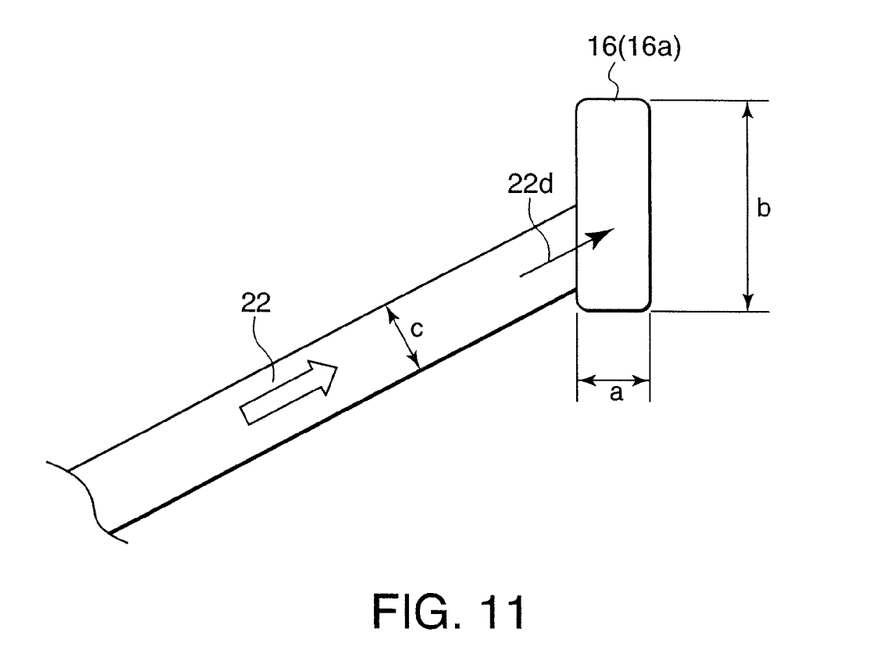
FIG. 11 is similar to FIG. 9, but shows the fourth embodiment of this invention.

Referring to FIGS. 10 and 11, in a connection structure according to a fourth embodiment of this invention, the connection portion 16a is formed with a vertically long rectangular cross-section, and the external fluid passage 22 is connected to the side face of the connection portion 16a from diagonally below. The transverse section of the internal manifold 16 is also set as a vertically long rectangular cross-section. When the horizontal dimension of the opening portion 16a is a, the vertical dimension is b, and the passage width of the external fluid passage 22 is c, the dimensions of the opening portion 16a and the external fluid passage 22 are set such that b>c and b>a.

Figure 12:
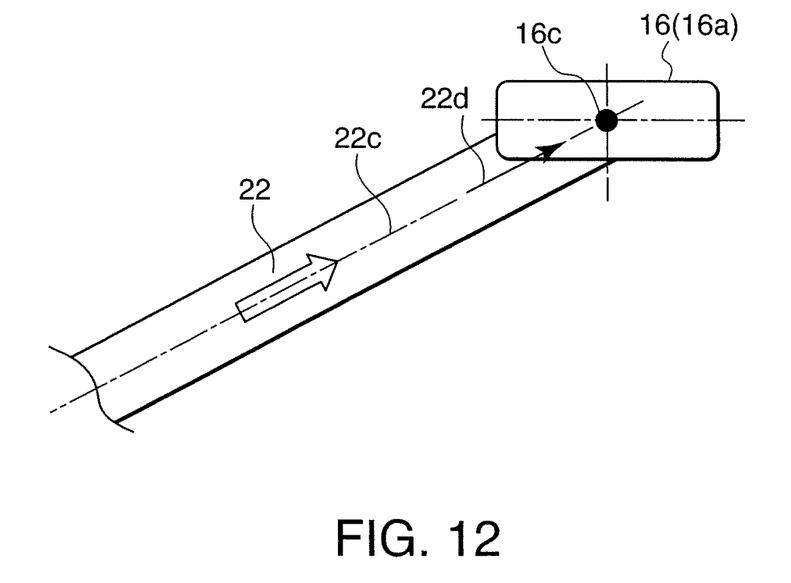
FIG. 12 is similar to FIG. 9, but shows a fifth embodiment of this invention.
Figure 13:
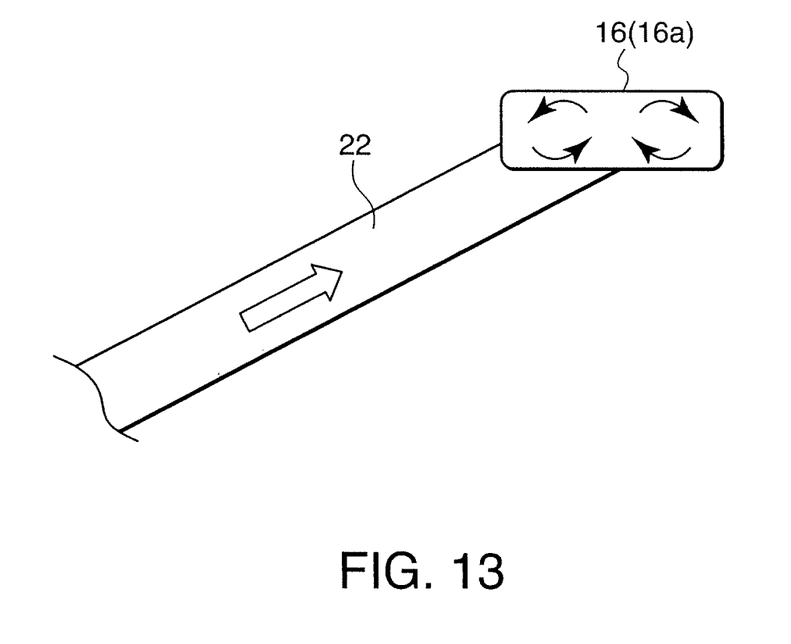
FIG. 13 is a schematic constitutional diagram of a connection portion between an external fluid passage and an internal manifold, illustrating the formation of a vortex flow according to the fifth embodiment of this invention.

Referring to FIGS. 12 and 13, in a connection structure according to a fifth embodiment of this invention, the external fluid passage 22 is connected to a corner portion on the side face of the connection portion 16a having a flat rectangular cross-section from diagonally below such that a center line of the external fluid passage 22 passes through a center 16c of the connection portion 16a. Similarly to the first embodiment, with this connection structure a bidirectional swirl is formed in the connection portion 16a and the transverse section of the upstream portion of the internal manifold 16, as shown in FIG. 13.

According to these simulations conducted by the inventors, a swirl can be formed in the internal manifold 16 with the connection structures according to all of the embodiments described above.

The contents of Tokugan 2005-312999, with a filing date of Oct. 27, 2005 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, in all of the embodiments described above, the external fluid passage 22 is connected to the connection portion 16a in accordance with the predetermined intersection angle α, but the intersection angle α is not an essential constitutional element of the connection structure for generating a swirl in the interior of the internal manifold 16. Even when the intersection angle α is zero, similarly to the prior art shown in FIG. 16, a swirl can be formed in the connection portion 16a and the internal manifold 16 by forming the connection portion 16a with a square transverse section and connecting the external fluid passage 22 to the connection portion 16a in an offset position from the center line of the transverse section, for example.

Hence, the connection structure between the external fluid passage 22 and the internal manifold 16 may take any structure that enables a swirl to be generated hydrodynamically in the interior of the internal manifold 16.

INDUSTRIAL APPLICABILITY

As described above, this invention generates a swirl inside an internal manifold of a fuel cell stack using the energy of a fluid flowing into the internal manifold from an external fluid passage. Therefore, a pressure deviation in a transverse section of the internal manifold can be reduced by means of a compact structure, and as a result, the fluid can be distributed evenly from the internal manifold to an in-cell fluid passage. Hence, this invention obtains particularly favorable effects when applied to a fuel cell system for an automobile.

The invention claimed is:

1. A fluid passage structure for a fuel cell stack comprising an internal manifold formed on an inner side of a laminated body of a plurality of fuel cells in a lamination direction, each fuel cell comprising an in-cell fluid passage connected to the internal manifold from an orthogonal direction, and an external fluid passage that supplies a fluid to the internal manifold, the external fluid passage being connected to one end of the internal manifold from an orthogonal direction, comprising:
a connection portion that connects the external fluid passage to the internal manifold diagonally when viewed from a central axis direction of the internal manifold such that the external fluid passage and a formation direction of the in-cell fluid passage form a predetermined intersection angle which is larger than zero degrees and smaller than ninety degrees.

2. The fluid passage structure for a fuel cell stack as defined in claim 1, wherein the connection portion is constituted to prevent the fluid from becoming separated from a wall surface of the internal manifold.

3. The fluid passage structure for a fuel cell stack as defined in claim 1, wherein the connection portion is constituted to prevent a reverse circulation phenomenon from occurring in the flow of the fluid through the internal manifold.

4. The fluid passage structure for a fuel cell stack as defined in claim 1, wherein the connection portion is constituted to provide the flow of the fluid through the internal manifold with the flow of the fluid having a speed component in a transverse direction of the internal manifold.

5. The fluid passage structure for a fuel cell stack as defined in claim 1, wherein the connection portion is constituted to connect the external fluid passage to the internal manifold in an offset position, which is a position offset from a center line of a transverse section of the internal manifold.

6. The fluid passage structure for a fuel cell stack as defined in claim 1, wherein a transverse section of the internal manifold is formed as a flat rectangular cross-section.

7. The fluid passage structure for a fuel cell stack as defined in claim 1, wherein a transverse section of the internal manifold is formed as a vertically long rectangular cross-section.

8. The fluid passage structure for a fuel cell stack as defined in claim 1, wherein the connection portion is constituted to form two swirls having different directions in the flow of the fluid in the internal manifold.

* * * * *